United States Patent

Bryan et al.

[11] Patent Number: 5,678,230
[45] Date of Patent: Oct. 14, 1997

[54] DISPOSABLE MEDIA FILTER

[75] Inventors: George H. Bryan, Concord; Mihai G. M. Pop, Lynchburg, both of Va.

[73] Assignee: Framatome Technologies, Inc., Lynchburg, Va.

[21] Appl. No.: 561,485

[22] Filed: Nov. 20, 1995

Related U.S. Application Data

[62] Division of Ser. No. 287,142, Aug. 8, 1994, Pat. No. 5,478,469.

[51] Int. Cl.$^6$ .......................................................... G21F 9/00
[52] U.S. Cl. ............................................. 588/1; 210/650
[58] Field of Search .................... 588/1; 210/650, 210/652, 484, 485, 500.41, 500.27, 232, 682, 767

[56] References Cited

U.S. PATENT DOCUMENTS

| | | | |
|---|---|---|---|
| 3,011,644 | 12/1961 | Farrell et al. | 210/448 |
| 3,327,858 | 6/1967 | Eddy et al. | 210/448 |
| 3,648,842 | 3/1972 | Zievers | 210/456 X |
| 4,023,944 | 5/1977 | Beane | 55/481 |
| 4,024,065 | 5/1977 | Morgan, Jr. | 210/448 |
| 4,427,547 | 1/1984 | Miller et al. | 210/448 |
| 4,495,072 | 1/1985 | Fields | 210/448 |
| 4,517,088 | 5/1985 | Miller | 210/448 |
| 5,015,375 | 5/1991 | Fleck | 210/232 |
| 5,200,067 | 4/1993 | Sann | 210/448 |
| 5,236,595 | 8/1993 | Wang et al. | 210/669 |

*Primary Examiner*—Ngoclan Mai
*Attorney, Agent, or Firm*—Rhodes Coats & Bennett, L.L.P.

[57] ABSTRACT

A filter for removing hazardous particulate matter from an aqueous flow. The filter includes a rigid support housing having an input port for the aqueous flow, an exit port for the aqueous flow, a brace to securingly engage a filter vessel for the aqueous flow, an internal seal and an external seal, and a disposable filter cartridge configured similarly to the housing and sized to be substantially entirely received within the housing and sealingly engage the internal seal and having a filter medium that extends across a path from the input port to the exit port when received in the housing, the cartridge having a terminal seal located to sealingly engage the cartridge to the aqueous flow filter vessel outside of the housing when the cartridge sealing engages with the internal seal. The rigid support housing may be installed in a filter vessel for an extended period and held in place by the brace, and repeatedly during the extended period, a disposable cartridge may be installed within the housing to seal the cartridge to the filter vessel, aqueous flow may be directed through the filter medium, and the cartridge may be removed and discarded.

5 Claims, 1 Drawing Sheet

DISPOSABLE MEDIA FILTER

This application is a division, of application Ser. No. 08/287,142, filed Aug. 8, 1994 U.S. Pat. No. 5,478,469.

BACKGROUND OF THE INVENTION

(1) Field of the Invention

The present invention relates generally to filters and, more particularly, to a disposable filter for removing particulate matter from an aqueous flow, especially radioactive materials entrained in cooling water, which provides an improved cartridge-style filter for use in such installations to reduce the volume and weight of the hazardous waste resulting from the end of life of the filter.

(2) Description of the Prior Art

Nuclear reactors use circulating water as a coolant for the radioactive core. Some of the particles picked up by the cooling water are radioactive. Before the water can be recirculated in the cooling loop, the radioactive materials must be removed. This is done conventionally by filter elements that are installed for a given period of time to remove the waste particles. After a period of time, the filter becomes clogged with removed particles and must be replaced.

Conventional filters for this purpose have a perforated, cylindrical stainless steel outer hull or, in some cases, an inner core, and a permanently installed interior filter medium. The filtrate flows from inside to outside through the filter medium and the pores of the stainless steel. The stainless steel hull has been considered a necessity to give the filter the structural strength and integrity to withstand the temperature, pressure and dynamic filtration loads of the forces of the flowing coolant and avoid corrosion.

However, when the filter is spent, the hull or core becomes a large, strong, corrosion resistant, heavy piece of hazardous, radioactive waste. Requirements for disposal of this type of waste safely are very costly. The steel is difficult to compress to a reduced volume and does not easily shred to smaller pieces. Disposal of the filter, therefore, requires a great deal of cost.

Thus, there remains a need for a new and improved disposable filter which performs well in existing facilities while, at the same time, reduces the cost of disposal of spent filters contaminated with hazardous materials such as radioactive particulate matter.

SUMMARY OF THE INVENTION

The present invention is directed to a filter assembly having a disposable filter cartridge which fulfills this need in the art by providing a filter for removing particulate matter from an aqueous flow which including a rigid support housing having an input port for the aqueous flow, an exit port for the aqueous flow, a brace to securingly engage a filter vessel for the aqueous flow, an internal seal and an external seal, and a disposable filter cartridge configured similarly to the housing and sized to be substantially entirely received within the housing and sealingly engage the internal seal and having a filter medium that extends across a path from the input port to the exit port when received in the housing. The cartridge has a terminal seal located to sealingly engage the cartridge to the aqueous flow filter vessel outside of the housing when the cartridge sealing engages with the internal seal. The rigid support housing may be installed in a filter vessel for an extended period and held in place by the brace, and repeatedly during the extended period, a disposable cartridge may be installed within the housing to seal the cartridge to the filter vessel, aqueous flow may be directed through the filter medium, and the cartridge may be removed and discarded.

In a preferred embodiment the housing has a cylindrical shape including two ends and a sidewall, with an input port at one end of the cylindrical shape and a plurality of exit ports in the form of apertures in the sidewall. Preferably, the external seal of the housing seals to the filter vessel at a position spaced from the terminal seal of the disposable cartridge. In the preferred embodiment the cartridge has a cylindrical shape including two ends and a sidewall, the terminal seal being located at one end, the sidewall extending across the path, and the other end engaging the internal seal of the housing.

Typically, the housing is made of stainless steel. In a preferred embodiment the cartridge includes a rigid porous sleeve and a flexible filtering medium within the sleeve. The sleeve may be polypropylene, and the flexible filtering medium may be of any suitable filtering medium such as polysulfone foam. The seals may be silicone rubber. A metal lifting point may be embedded in the terminal seal or the rubber end of the filter may be designed to facilitate the insertion and removal of the filter by the use of special tools.

The invention also provides a disposable filter cartridge for removing particulate matter from an aqueous flow and for installation inside a support housing that is attached to an aqueous flow filter vessel and that has an entrance ports at one end and exit ports in a housing sidewall. The cartridge includes a rigid, porous, sheath having first and second ends, a flexible filtering medium within the sheath, a first seal on the first end of the sheath, and a second seal on the second end of the sheath. The sheath and filtering medium are configured similarly to the housing and sized to be substantially entirely received within the housing and to sealingly engage the housing with the first seal and the filter medium extending across a path from the input ports to the exit ports of the housing. The second seal is located to sealingly engage the cartridge to the aqueous flow filter vessel outside of the housing when the first seal engages with the housing. The disposable cartridge may be installed within the housing to seal the cartridge to the filter vessel, aqueous flow may be directed through the filter medium, and the cartridge may be subsequently removed and discarded.

The invention also provides a method of removing particulate matter from an aqueous flow including installing a rigid support housing in a filter vessel for the aqueous flow for an extended period, periodically during the extended period installing a disposable filter cartridge in the housing and sealing the filter cartridge in the housing with a filter medium extending across a path from an input port to an exit port in the housing, and sealingly engaging the cartridge to the aqueous flow filter vessel outside of the housing as the cartridge engages the housing, directing an aqueous flow through the filter cartridge, removing the cartridge when the filter cartridge is spent, and discarding the cartridge.

The discarding step may include compacting the cartridge or shredding the cartridge. Preferably the discarding step includes shredding the cartridge followed by compacting the shredded cartridge.

The directing step may comprise directing cooling water from a nuclear reactor or other water source containing hazardous particulate matter through the filter cartridge.

Accordingly, one aspect of the present invention is to provide a filter for removing particulate matter from an aqueous flow. The filter includes: (a) a rigid support housing having an input port for the aqueous flow, an exit port for the aqueous flow, a brace to securingly engage a filter vessel for the aqueous flow, an internal seal and an external seal; and (b) a disposable filter cartridge configured similarly to the housing and sized to be substantially entirely received within the housing and sealingly engage the internal seal and having a filter medium that extends across a path from the input port to the exit port when received in the housing, the cartridge having a terminal seal located to sealingly engage the cartridge to the aqueous flow filter vessel outside of the housing when the cartridge sealing engages with the internal seal, whereby the rigid support housing may be installed in a filter vessel for an extended period and held in place by the brace, and repeatedly during the extended period, a disposable cartridge may be installed within the housing to seal the cartridge to the filter vessel, aqueous flow may be directed through the filter medium, and the cartridge may be removed and discarded.

Another aspect of the present invention is to provide a disposable filter cartridge for removing particulate matter from an aqueous flow and for installation inside a support housing that is attached to an aqueous flow filter vessel and that has an input port at one end and exit ports in a housing sidewall. The cartridge includes: (a) a rigid, porous, sleeve having first and second ends; (b) a flexible filtering medium affixed to the sleeve; (c) a first seal on the first end of the sleeve; and (d) a second seal on the second end of the sleeve, the sleeve and filtering medium configured similarly to the housing and sized to be substantially entirely received within the housing and to sealingly engage the housing with the second seal and the filter medium extends across a path from the input ports to the exit ports of the housing, the second seal located to sealingly engage the cartridge to the aqueous flow filter vessel outside of the housing when the first seal engages with the housing, whereby the disposable cartridge may be installed within the housing to seal the cartridge to the filter vessel, aqueous flow may be directed through the filter medium, and the cartridge may be subsequently removed and discarded.

Still another aspect of the present invention is to provide a filter assembly for removing particulate matter from an aqueous flow. The filter assembly includes: (a) a rigid support housing having an input port for the aqueous flow, an exit port for the aqueous flow, a brace to securingly engage a filter vessel for the aqueous flow, an internal seal and an external seal; (b) a disposable filter cartridge configured similarly to the housing and sized to be substantially entirely received within the housing and sealingly engage the internal seal, the cartridge including: (i) a rigid, porous sleeve having first and second ends; (ii) a flexible filtering medium affixed to the sleeve; (iii) a first seal on the first end of the sleeve; and (iv) a second seal on the second end of the sleeve, the sleeve and filtering medium configured similarly to the housing and sized to be substantially entirely received within the housing and to sealingly engage the housing with the second seal and the filter medium extends across a path from the input ports to the exit ports of the housing, the second seal located to sealingly engage the cartridge to the aqueous flow filter vessel outside of the housing when the first seal engages with the housing, whereby the disposable cartridge may be installed within the housing to seal the cartridge to the filter vessel, aqueous flow may be directed through the filter medium, and the cartridge may be subsequently removed and discarded; and (c) a metal lifting point embedded in the second seal.

These and other aspects of the present invention will become apparent to those skilled in the art after a reading of the following description of the preferred embodiment when considered with the drawings.

DESCRIPTION OF THE PREFERRED EMBODIMENTS

Figure 1:
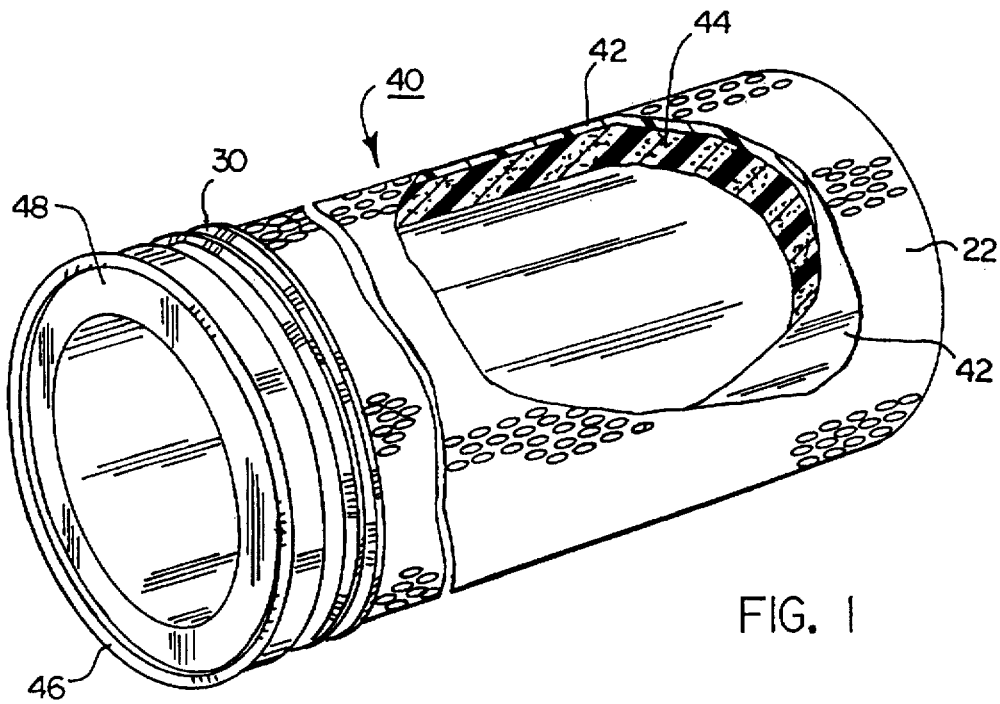
FIG. 1 is a perspective view of a filter cartridge according to one embodiment of the invention, with a portion of the cylinder broken away to show layers of the cartridge.

In the following description, like reference characters designate like or corresponding parts throughout the several views. Also in the following description, it is to be understood that such terms as "forward", "rearward", "left", "right", "upwardly", "downwardly", and the like are words of convenience and are not to be construed as limiting terms.

Figure 2:
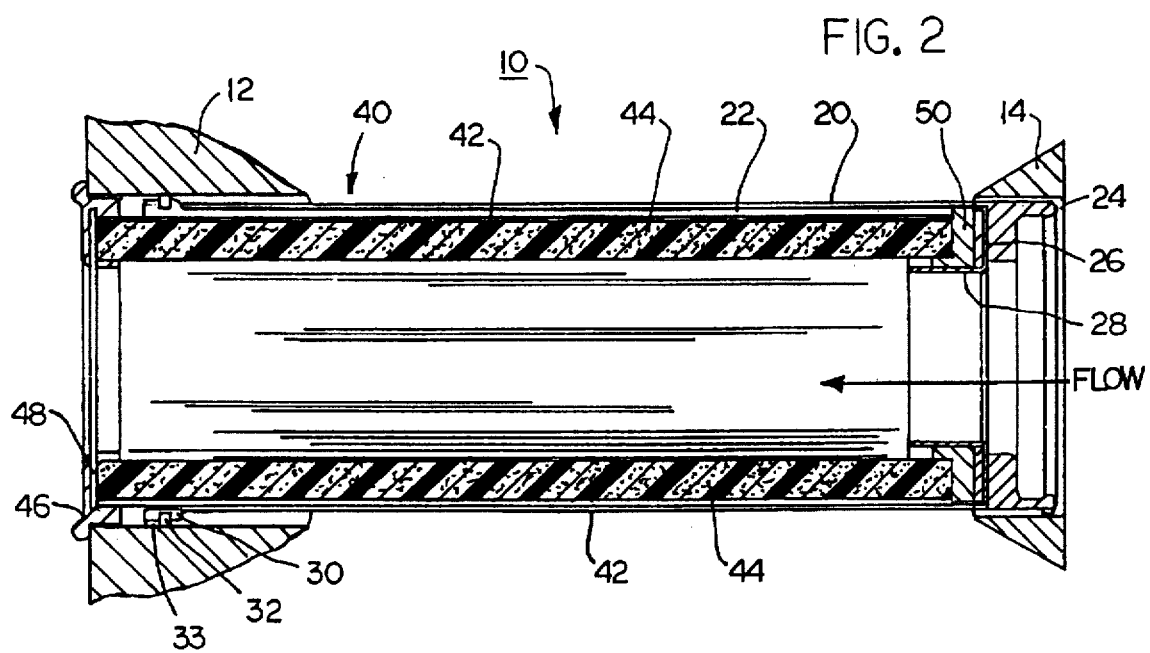
FIG. 2 is a view of an installed filter and its cartridge according to a preferred embodiment.

Referring now to the drawings in general and FIG. 2 in particular, it will be understood that the illustrations are for the purpose of describing a preferred embodiment of the invention and are not intended to limit the invention thereto. As best seen in FIG. 2, filter assembly 10 is mounted in an aqueous flow filter vessel, such as the type present in the cooling circuits of a nuclear reactor, by seals formed with fittings 12 and 14. The fittings actually are part of the filter vessel itself and are machined surfaces where the conventional filter cartridge seals engage. In the depicted embodiment, the filter assembly spans the fittings 12 and 14, with coolant being supplied to the filter from one or the other of the ends through the fittings 12 and 14, as shown by the arrows The filter assembly includes two separable parts. The first is a housing 20 semi-permanently mounted in the fittings 12 and 14. A predominant proportion of housing 20 is a perforated, stainless steel cylinder 22. Other suitable materials can be used. Cylinder 22 has one end embedded in an elastomeric seal 24, which seals in fitting 14 when the housing is installed. Also annularly embedded in the seal 24 is a metal reinforcing ring 26 having a shorter, inner cylinder 28 affixed in it. The other end of the cylinder 22 has a reinforcing ring 30 attached and a seal 32 in a channel 33 in the ring 30, to make a seal with the fitting 12.

Located inside the shroud 20 is a replaceable filter cartridge 40. The cartridge includes a rigid, porous, cylindrical sleeve 42 with a flexible filtering medium 44 within the sleeve. A first seal 50 on one end of the cartridge is sized to fit in the annular chamber formed between the cylinder 22 and the cylinder 28 and make a good seal. A second seal 46 on the other end of the cartridge is configured to sealingly engage the filter vessel top surface 12. The axial lengths of the housing and cartridge are selected so that the seals 50 and 46 are made with the cartridge fully inserted in the housing 20.

The sleeve 42 is preferably polypropylene and the flexible filtering medium is preferably polysulfone or polypropylene. Other suitable materials can be substituted. The sleeve should have sufficient rigidity to give the cartridge enough resistance to compression that proper seals can be made with the housing 20 and the fitting 12. The structural strength of the sleeve may be otherwise obtained or may be enhanced by providing pleats or corrugations in the cartridge. The filtering medium filters particles in the range of between about 0.2 to 100 microns.

Preferably, the seals are silicone rubber, but other suitable materials can be used. The filter cartridge may also include a metal lifting point 48 embedded in seal 46. These can be any suitable design.

In use, the housing 20 is installed in the flow filter vessel by securing the seal 24 in fitting 14 and seal 32 in fitting 12. The housing may remain in place for an extended period of time, perhaps several years. It need only be replaced when the materials it is composed of are no longer reliable as to withstand the temperature, pressure and dynamic filtration loads of the forces of the flowing coolant.

The cartridge 40 can then be installed in the housing 20 in a straightforward manner. The cartridge 40 is merely inserted into the housing 20 until the seals 50 and 46 make secure contact with their respective sealing surfaces. The filter medium 44 therefore will extend across a path from input ports at fittings 12 and 14 to the perforations in the housing, serving as exit ports from the filter assembly. Then, the filtrate in the form of an aqueous flow may be directed through the filter cartridge. Contaminants will be trapped in the filter medium 44 and cleansed water will pass through.

Over time the trapped contaminants will collect to the point that the filter is no longer useful. This point can be determined in any desired conventional manner, such as measuring the pressure drop across the filter, the level of radiation in the filter or according to a predetermined maintenance schedule. At this time the cartridge can be removed, leaving the stainless steel housing 20 in place. A new cartridge 40 may be installed in its place and used in similar fashion. This may be repeated numerous times. The useful life of the cartridge is comparable to the life of conventional filters.

Removed cartridge cans be discarded at relatively low cost. In accordance with conventional procedures, the cartridge can be compacted for disposal, since it is nowhere near as strong and rigid as conventional stainless steel-housed filters. The shredded material can be combined with other shreddable waste. This permits various low level waste sources to be shredded and compacted into blocks for disposal. A volume reduction of greater than 100 to 1 can be obtained in most instances.

Certain modifications and improvements will occur to those skilled in the art upon a reading of the foregoing description. By way of example, in a similar embodiment, the stainless steel supporting structure is on the inside of the replaceable filter cartridge to adapt the assembly for use in filter vessels piped for flows where the liquid passes from the outside to the inside of the filter. Also, in another similar embodiment one end of the replaceable filter cartridge is closed and made without seal 46 for use in filter vessels that do not require this sealing surface. It should be understood that all such modifications and improvements have been deleted herein for the sake of conciseness and readability but are properly within the scope of the following claims.

We claim:

1. A method of removing particulate matter from an aqueous flow containing hazardous particulate matter, said method comprising the steps of:

(a) installing a rigid support housing in a filter vessel for the aqueous for an extended period;

(b) periodically during the extended period installing a disposable filter cartridge in the housing and sealing the filter cartridge in the housing with a filter medium extending across a path from an input port to an exit port in the housing, and sealingly engaging the cartridge to the aqueous flow filter vessel outside of the housing as the cartridge engages the housing;

(c) directing an aqueous flow through the filter cartridge;

(d) removing the cartridge when the filter cartridge is spent; and (e) discarding the cartridge.

2. The method according to claim 1, wherein the discarding step includes compacting the cartridge.

3. The method according to claim 1, wherein the discarding step includes shredding the cartridge.

4. The method according to claim 1, wherein the discarding step includes shredding the cartridge followed by compacting the shredded cartridge.

5. The method according to claim 1, wherein the directing step includes directing cooling water from a nuclear reactor through the filter cartridge.

* * * * *

UNITED STATES PATENT AND TRADEMARK OFFICE
CERTIFICATE OF CORRECTION

PATENT NO. : 5,678,230
DATED : October 14, 1997
INVENTOR(S) : George H. Bryan et al.

It is certified that error appears in the above-identified patent and that said Letters Patent is hereby corrected as shown below:

In Claim 1 (a), line 2, insert --flow-- after aqueous.

Signed and Sealed this

Eighth Day of June, 1999

Q. TODD DICKINSON

*Attest:*

*Attesting Officer*  *Acting Commissioner of Patents and Trademarks*